Nov. 23, 1954  F. D. STOOPS  2,695,325
ISOMERIZATION PROCESS
Filed June 12, 1950
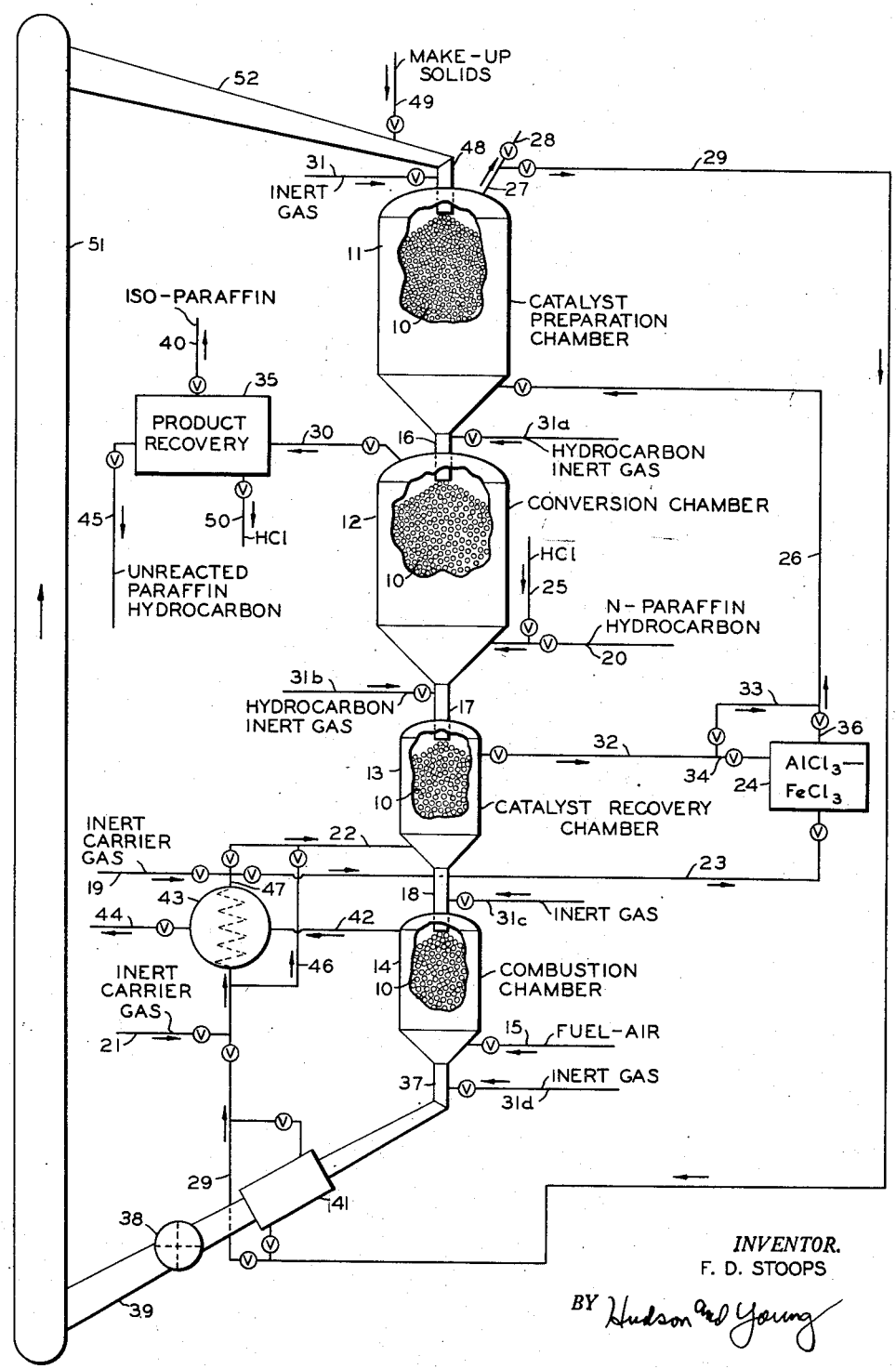
INVENTOR.
F. D. STOOPS
BY Hudson and Young
ATTORNEYS

United States Patent Office 2,695,325
Patented Nov. 23, 1954

2,695,325

ISOMERIZATION PROCESS

Forrest D. Stoops, Bartlesville, Okla., assignor to Phillips Petroleum Company, a corporation of Delaware Application June 12, 1950, Serial No. 167,588

13 Claims. (Cl. 260—683.5)

This invention relates to the isomerization of hydrocarbons. In one embodiment this invention relates to the isomerization of normal paraffinic hydrocarbons to isoparaffinic hydrocarbons. In another embodiment this invention relates to the utilization of a contiguous mass of flowable particulate solids in the isomerization of hydrocarbons.

Various processes are known in the art for isomerizing paraffinic hydrocarbons. Friedel-Crafts type catalysts, such as aluminum chloride, zinc chloride, ferric chloride, and the like, have been utilized in various of such type processes either alone or in conjunction with a carrier material such as alumina, clays, as for example, bauxite, pumice, and the like. Of these catalysts, aluminum chloride supported on a porous carrier, such as a bauxite, has been found to be particularly suitable in the isomerization of paraffinic hydrocarbons to isoparaffinic hydrocarbons.

One well-known method for using such a catalyst involves preparation of the supported catalyst in the reaction vessel in which the isomerization is to be conducted. In this manner, aluminum chloride is carried into a body of bauxite as a vapor and caused to condense on the bauxite particle surfaces to form the desired bauxite-supported aluminum chloride isomerization catalyst. Once the aluminum chloride is deposited on the bauxite in the desired proportion, vaporous isomerization feed is passed in contact therewith. This process, although offering certain advantages with respect to catalyst preparation and handling, is a cyclic type operation and requires a certain amount of "off-stream" time which at best is remedied by employing duplicate equipment so that one catalyst is operated on-stream while another is being regenerated or prepared. Such operation requires a duplication of equipment, thus increasing the equipment requirements.

In the type isomerization discussed above, the on-stream cycle is operated over a period of time during which the activity of the catalyst is initially high and then progressively decreases until the conversion is so low that it is no longer economically advantageous to continue the cycle. The over-all conversion is accordingly lower than that obtained during the initial part of the on-stream cycle, when the catalyst activity is at the highest level.

In numerous instances ferric chloride build-up occurs in the catalyst, resulting in abnormally large amounts of ferric chloride therein, the concentration of which must necessarily be controlled to prevent the occurrence of extensive undesirable side reactions. Ferric chloride build-up can occur as a result of conversion of any iron in the carrier material to ferric chloride during the isomerization, as a result of the presence of hydrogen chloride in the system, and the reaction of same with that iron. Ferric chloride content, as a function of the amount of iron in the initially added carrier, soon reaches a maximum level dependent upon the initial iron content in the carrier. However, additional ferric chloride is generally formed in such an isomerization system as a result of reaction of hydrogen chloride with iron present in any make-up carrier added and in the steel materials from which the reaction vessel is fabricated. In such a case the concentration of ferric chloride in the isomerization catalyst increases with the life of the catalyst. Although it is desirable to maintain a certain concentration of ferric chloride in an aluminum chloride isomerization catalyst, ferric chloride generally must be removed therefrom in order that its concentration be controlled and a most efficient conversion be carried on. When utilizing a support material low in iron or free from iron, and/or a reaction vessel fabricated of substantially iron free materials, it is advantageous to add ferric chloride to the catalyst in the proper proportions, such proportions generally being those added to provide a finished catalyst containing aluminum chloride in a mol ratio to ferric chloride within the limits of 0.5:1 to 20:1.

My invention is concerned with the isomerization of normal paraffinic hydrocarbons to isoparaffinic hydrocarbons, utilizing a supported aluminum chloride type catalyst in a new and novel manner. In one embodiment, I have provided a process utilizing a contiguous moving mass of particulate solid material as a carrier on which aluminum chloride and ferric chloride are maintained in predetermined proportions in a single isomerization zone, the catalyst activity, efficiency and conversion level of the isomerization reaction are each maintained at a maximum level at all times. No cyclic type operation is required and there is no need for duplicate equipment in the practice of my invention.

An object of my invention is to provide for the isomerization of a normal paraffinic hydrocarbon to an isoparaffinic hydrocarbon.

Another object is to provide for the utilization of a contiguous flowable mass of solid particulate materials in a process for the isomerization of a normal paraffinic hydrocarbon to an isoparaffinic hydrocarbon in the presence of aluminum chloride as a catalyst.

Another object is to provide for controlling the concentration of ferric chloride in an aluminum chloride catalyst, utilized in the isomerization of straight chain paraffin hydrocarbons.

Another object is to provide a process for the isomerization of a normal paraffin hydrocarbon utilizing a supported aluminum chloride catalyst, wherein the activity of the catalyst and efficiency of the isomerization is maintained at a maximum level at all times.

Another object is to provide for the efficient utilization of aluminum chloride as a catalyst in a process for the isomerization of normal paraffinic hydrocarbons.

Another object of my invention is to provide for the efficient recovery of aluminum chloride from spent catalyst in a catalytic process for the isomerization of a normal paraffin hydrocarbon, employing aluminum chloride as a catalyst.

Other objects and advantages will be apparent to those skilled in the art from the accompanying discussion and disclosure.

In accordance with one embodiment of my invention, I have provided a process for isomerizing a normal paraffinic hydrocarbon to an isoparaffinic hydrocarbon in which the catalyst is aluminum chloride together with a proportion of ferric chloride, supported on a solid granular carrier. My process involves continuously flowing a contiguous mass of flowable particulate solids as such a carrier, by gravity through a series of four separate zones. Each of the zones is thus filled with the contiguous mass of solids. That portion of the contiguous mass of solids flowing through the first zone, i. e. in the uppermost position, is contacted with a stream of gas containing vapors of the catalyst, i. e. vapors of aluminum chloride and ferric chloride vapors, under conditions of temperature and pressure, to insure condensation of the catalyst vapors in the first zone and deposition of resulting condensate on the surfaces of solids therein. In this manner, a catalyst preparation is conducted, the resulting catalyst comprising the carrier material impregnated with fresh aluminum chloride and ferric chloride. That portion of the contiguous mass of solids flowing through the second zone, i. e. positioned below the first zone, is contacted with a stream of the paraffinic hydrocarbon reactant material to be isomerized under temperature and pressure conditions well-known to those skilled in the art for isomerizing such a material in the presence of a supported aluminum chloride catalyst. Isomerization product is recovered from gaseous effluent from the second zone.

During the isomerization in the second zone, some aluminum chloride and ferric chloride reacts with hydrocarbon to form a liquid complex, commonly referred to as sludge. Some carbonaceous materials are also formed as by-product during this reaction. Sludge and carbonaceous by-product materials thus formed adhere to the surfaces of the solids to be passed from the second zone.

That portion of the contiguous mass of solids passed from the second zone, and containing by-product impurities on its particle surfaces, is contacted with a chemically inert gas while flowing through the third zone, i. e. positioned below the second zone, at a temperature sufficiently high to insure distillation of all the active aluminum chloride in the complex and of all or a predetermined proportion of ferric chloride therein. The temperature is generally selected whereby only a desired amount of ferric chloride is distilled from the complex during the time that the solids are passed through the third zone. Aluminum chloride and ferric chloride vapors are thus liberated into the contacting gas which is then withdrawn from the third zone and introduced into the first zone, described above, under conditions causing the catalyst vapors therein to condense on the carrier, as described. A portion of this gas stream containing catalyst vapors, can be passed in contact with a separate supply of aluminum chloride, or aluminum chloride and ferric chloride, under temperature conditions causing some of the chloride thus contacted, to be volatilized and carried into the first zone as make-up catalyst.

That portion of the contiguous mass entering the fourth zone contains carbonaceous matter together with any residual ferric chloride adhered to its particle surfaces, and is burned free of these by-product materials as it flows through the fourth zone, i. e. positioned below the third zone. The proportion of oxygen introduced into the fourth zone to support the burning of these byproduct materials is regulated to control the temperature of the burning, so that the temperature of solids discharged from the fourth zone is maintained at a predetermined level to permit their return to the first zone, and recirculation through the system.

Operating in the manner described, the activity of the supported aluminum chloride catalyst utilized in the isomerization step in the second zone is maintained at a constant maximum level and the required ratio of aluminum chloride to carrier is significantly lower than that utilized in accordance with conventional procedures of the type discussed herein. For these reasons, conversion is maintained at a maximum and constant high level, while the amount of aluminum chloride required is less than utilized heretofore. Furthermore, a ferric chloride content of desired amount is maintained and controlled and a minimum of side reactions takes place during the isomerization.

In the following description one embodiment of my invention is specifically disclosed with reference to the attached drawing. It is to be understood that the drawing is a diagrammatic illustration of one method of operating the process of my invention and that it may be altered in many respects by those skilled in the art and yet remain within the intended scope of my invention.

Referring then to the drawing, a contiguous mass of flowable solid particulate material 10 is passed by gravity through a series of solids-containing chambers comprising catalyst preparation chamber 11, conversion chamber 12 disposed below chamber 11, catalyst recovery chamber 13 disposed below chamber 12, and combustion chamber 14 disposed below chamber 13, and conduits 16, 17, and 18, interconnecting these chambers Contiguous mass 10 comprises any suitable carrier material that can be impregnated with aluminum chloride and ferric chloride to form a finished catalyst having activity as a catalytic material in the isomerization of a normal paraffinic hydrocarbon to an isoparaffinic hydrocarbon. Material making up contiguous mass 10 can be a porous granular carrier material, such as alumina, various types of bauxite, or other clays, active carbon, pumice, or the like. Preferably, a low iron bauxite having a mesh size within the limits of 2 to 8 is utilized as such a carrier. A stream of a carrier gas chemically inert with respect to aluminum chloride, ferric chloride, and carrier material 10, is passed from line 19 or 21, or both, as described hereafter, through lines 22 and/or 23, to provide a stream of such gas containing aluminum chloride alone, or aluminum chloride and ferric chloride in line 26. The inert carrier gas is contacted with mass 10 in chamber 13 containing active aluminum chloride and relatively smaller amounts of ferric chloride on its particle surfaces, and with aluminum chloride alone, or aluminum chloride with ferric chloride, in chamber 24, as described hereafter. That portion of contiguous mass 10 in chamber 11 is maintained at a temperature within the limits of 200 to 350° F. which temperature is generally controlled by a combustion in chamber 14, to be described hereafter, together with any supplemental cooling desired. Total gaseous material in line 26 at a temperature of at least 375° F. and preferably within the limits of 450 to 750° F. is passed into chamber 11 at a point in the lower portion thereof and contacted therein in countercurrent flow relation with solids mass 10. The pressure maintained in chamber 11 under these temperature conditions is preferably within the range of 0 to 15 p. s. i. g. Under these temperature and pressure conditions in chamber 11, aluminum chloride alone or with ferric chloride is condensed and collects on the solids surfaces of the carrier material to form the supported aluminum chloride catalyst to be utilized in the conversion step in chamber 12. Off-gas from chamber 11 is withdrawn through lines 27 and 28, or more preferably through lines 27 and 29 and recycled as described hereafter. The normal paraffinic hydrocarbon to be isomerized is contacted with the portion of contiguous mass 10 in conversion chamber 12 under temperature and pressure conditions well-known in the art for effecting such an isomerization in the presence of a supported aluminum halide catalyst. This is done by passing the normal paraffinic feed through line 20 into chamber 12, together with any required hydrogen chloride introduced through line 25, and withdrawing total gaseous effluent from chamber 12, containing isoparaffin product of isomerization, through line 30. The amount of hydrogen chloride required is generally from 2 to 8 per cent, based on the weight of paraffinic feed introduced through line 20. Effluent in line 30 is passed into separation zone 35, wherein isoparaffin product and unreacted paraffinic feed are separated, the former being withdrawn through line 40 and the latter through line 45. Hydrogen chloride is separated in zone 35 and withdrawn through line 50, and preferably recycled to conversion chamber 12.

The temperature of that portion of contiguous mass 10 in chamber 12 is determined by the temperature of those solids discharged from chamber 11 through throat 16 and is generally within the range of from 100 to 360° F. The isomerization in chamber 12 is a vapor phase reaction and is generally conducted under a pressure in the range discussed above, i. e., 0 to 15 p. s. i. g. Catalyst entering chamber 12 comprises fresh aluminum chloride on the support and is highly active. The ratio of aluminum chloride to carrier material is generally within the limits of about 0.1:1 to 0.3:1 on a weight basis which is relatively low compared to that generally utilized in the isomerization of, for example, normal butane to isobutane, in the presence of aluminum chloride on bauxite, the latter more often being within the limits of 0.1:1 to 0.7:1 on a weight basis.

A sufficient amount of aluminum chloride is present on the carrier material as the catalyst flows through chamber 12, so that that catalyst is retained at a constant maximum activity level while in chamber 12. Accordingly, the isomerization reaction, as conducted in accordance with my invention, is maintained at the maximum high activity level to provide for a high yield of isomerization product. The amount of aluminum chloride required, based for example, on the volume of isoparaffinic hydrocarbon produced, is maintained at a minimum, by virtue of the high constant conversion level and the low ratio of aluminum halide to carrier material required.

During the conversion in chamber 12 some by-product is formed comprising a liquid sludge-like material or complex of hydrocarbon, aluminum chloride, and generally some ferric chloride, such by-product material adhering to the surfaces of the particles of mass 10 therein. Also formed as by-product are certain carbonaceous materials also deposited on the solids surfaces in chamber 12. The amount of complex formed does not generally exceed that which is carried from chamber 12 on the solids surfaces of particles of mass 10. When employing normal paraffinic hydrocarbon feed materials containing more than 4 carbon atoms in the molecule, generally pentanes or hexanes, a higher proportion of sludge material is formed, in which instance I prefer to adjust the ratio of paraffinic feed material introduced into chamber 12 to solids passed therethrough in order to minimize the presence of free flowing by-product complex. However, it is to be understood that if desired, such sludge type materials can be formed in chamber 12 in amounts exceeding those which can be carried from chamber 12 on the solids particle surfaces.

That portion of contiguous mass 10 flowing through chamber 13 contains sludge and carbonaceous by-product materials on its surfaces, or in some instances, liquid complex flowing therethrough. A major proportion of the active aluminum chloride in the sludge type by-product, and in many instances all of it, and a predetermined proportion of the ferric chloride therein, is removed and returned to chamber 11 in the inert carrier gas stream in line 26, discussed above, and deposited on the surfaces of solids in contiguous mass 10 in chamber 11. In this manner, active aluminum chloride can be substantially completely recovered from the total spent catalyst and reused, and ferric chloride is returned in the required proportion to maintain the desired ratio of aluminum chloride to ferric chloride in the supported catalyst formed in chamber 11. In the recovery of aluminum chloride and ferric chloride carried into chamber 13 a preheated inert stream of the chemically inert carrier gas discussed above is passed through line 22 into chamber 13 at a point in the lower portion thereof, and therein contacted preferably in countercurrent flow relation with solids at a required temperature for distilling aluminum chloride and the desired proportion of ferric chloride from the complex material. Generally, the temperature of the gas introduced through line 22 is within the limits of about 500 to 1200° F. Temperatures in the lower portion of this 500 to 1200° F. range, such as from 500 to 750° F., are more generally utilized when only a small proportion of ferric chloride, or none at all, is to be distilled from the complex; similarly, higher temperatures within the 500 to 1200° F. range are utilized when larger proportions of ferric chloride are to be removed. Under these temperature conditions, aluminum chloride alone, or with ferric chloride, distilled from complex in chamber 13, is carried as vapor from chamber 13 through line 32, and passed into line 26, either through line 33, or through line 34, aluminum chloride ferric chloride chamber 24 and line 36, or via both these routes. Chamber 24 contains fresh aluminum chloride alone, or together with any desired proportion of fresh ferric chloride. It is preferred that gas in line 26 be at a temperature below 750° F. as already discussed. Accordingly, when the temperature of gas effluents from chamber 13 is above about 750° F. it will be advantageous to cool them by any suitable means. When passing gaseous effluent from chamber 13 through chamber 24, an amount of aluminum chloride alone, or with ferric chloride, is volatilized and removed from chamber 24 in the off-gas in line 36 to effect a final regulation of the amount of aluminum chloride and any ferric chloride to be introduced into chamber 11, with respect to solids mass 10 introduced in chamber 11.

If desired, the inert carrier gas in line 22 may consist of off-gas recycled through line 29 from chamber 11, preheated as described hereafter, alone or together with make-up gas from lines 19 and/or 21. Similarly, if desired, the inert gas passed through chamber 24 can be preheated recycled gas from line 29, with or without make-up gas.

That portion of solids mass 10 in chamber 14 contains carbonaceous by-product adhered on its surfaces, together with any residual ferric chloride not returned from chamber 13 to chamber 11. Both any residual ferric chloride, and the carbonaceous by-product, are removed from the surfaces of particles of mass 10 in chamber 14 by combustion. Solids withdrawn from chamber 14, free of such by-product materials, are returned to chamber 11 for preparation of the catalyst and recirculation through the system.

The combustion in chamber 14 is conducted by introducing fuel and free oxygen in proportions such that carbonaceous matter on the solids particles in chamber 14 and fuel are burned at a temperature generally within the limits of 900 to 1200° F. When utilizing natural gas, the fuel-air mixture introduced through line 15 will generally contain from about 2 to 5 per cent oxygen by volume. Solids are withdrawn from chamber 14 through line 37 and discharged through star valve 38 through chute 39 into elevator 51 and elevated into chute 52 and through solids inlet 48 located in the top of chamber 11. The rate at which solids are passed through the entire system is controlled by means of star valve 38 or any suitable solids flow control mechanism known in the art. If desired, solids flowing through chute 39 can be cooled in heat exchange relation with gases recycled through line 29 and heat exchanger 41. However, any conventional cooling material desired can be utilized in exchanger 41, such as water, steam, or the like. Combustion gas formed in chamber 14 as a result of burning of fuel and carbonaceous matter is discharged from chamber 14 through line 42, heat exchanger 43, and line 44. Ferric chloride vapors are present in the combustion gas in line 44, when any residual ferric chloride is present on the surfaces of solids introduced into chamber 14, in which case ferric chloride is distilled from the solids surfaces at the temperature of the burning therein. Ferric chloride present in the combustion gas in line 44 can be recovered in a subsequent recovery step, and utilized in chamber 24, if desired. Effluent gases in line 42 enter exchanger 43 at a temperature in the range already discussed, 900 to 1200° F., and are passed in indirect heat exchange with recycled gas from line 29, supplemented, if desired, by make-up inert carrier gas introduced through line 21. The temperature of the gas thus preheated in exchanger 43 is regulated to provide the gas streams in line 22 and/or 23 at the desired temperature for volatilizing aluminum chloride and ferric chloride, and for carrying these materials into chamber 11 as vapors. One manner in which the temperature of gases in lines 22 and 23 can be regulated is illustrated by means of by-pass line 46 by means of which relatively cool gas from line 29 can be admixed with a remaining portion of such gas preheated in exchanger 43 in such proportions that the resulting blend in line 22 is at the desired temperature.

In carrying out the process as illustrated in the drawing, it is often advantageous to construct chambers 13 and 14 of a size smaller than that of either chambers 11 or 12, since in many instances the duration of the conversion reaction is longer than that of recovery and combustion steps, based on the rate of flow of mass 10 through these respective chambers.

If desired, the process of my invention can be conducted on an intermittent flow basis. Such operation would be controlled by means of star valve 38 by means of which each of the steps would be conducted for any desired duration and then terminated as desired until the conversion step in chamber 12 were completed, and then moving the entire contiguous mass in an amount to transfer solid materials from each chamber to the adjacent downstream chamber. In this manner the chambers 11, 12, 13, and 14 can be of about the same size and the operation of chambers 11, 13, and 14 terminated as desired until the conversion in chamber 12 is complete.

Inert gas seals are provided as illustrated in the drawing through lines 31, 31a, 31b, 31c, and 31d.

Any make-up solids material can be added to the system, into chute 52 through line 49.

Various inert carrier gases that can be utilized in accordance with my invention include dry flue gas, nitrogen, carbon dioxide, and preferably, a gaseous stream of the paraffinic hydrocarbon reactant material, a stream of n-butane being particularly applicable.

My invention is particularly applicable to the isomerization of paraffin hydrocarbon reactants containing from 4 to 7 carbon atoms in the molecule, and especially a feed stock comprising n-butane containing up to from 50 to 80 per cent by weight of a $C_5$ to $C_7$ normal paraffinic hydrocarbon. My process provides for continuously removing sludge from the conversion system, whereas in accordance with conventional vapor phase isomerization processes, sludge materials accumulate and reduce the overall catalyst activity, particularly in the lower portion of the isomerization zone.

It will be appreciated that in accordance with the process of my invention, I provide a supported catalyst in the conversion zone having a substantially sludge-free surface of fresh aluminum chloride and ferric chloride, and hence the activity of the catalyst is maintained at the constant high level already described. Sludge can be efficiently removed from the conversion chamber, as formed, by merely increasing the rate of solids flow therethrough, to maintain the solids surfaces of fresh aluminum chloride and ferric chloride substantially sludge-free. This is particularly advantageous when isomerizing n-butane feed, containing appreciable proportions of heavier normal paraffinic hydrocarbons.

As will be evident to those skilled in the art, various modifications can be made or followed, in the light of the foregoing disclosure and discussion, without departing from the spirit or scope of the disclosure or from the scope of the claims.

I claim:

1. A catalytic process for isomerizing a normal paraffinic hydrocarbon to an isoparaffinic hydrocarbon, comprising gravitationally flowing a contiguous mass of flowable particulate solids through a series of zones comprising a catalyst preparation zone, a conversion zone disposed below said catalyst preparation zone, a catalyst recovery zone disposed below said conversion zone and a combustion zone disposed below said catalyst recovery zone; contacting that portion of said contiguous mass flowing through said catalyst preparation zone with a gas stream containing vapors of aluminum chloride together with ferric chloride vapors, removed from said recovery zone as described hereafter; maintaining temperature and pressure conditions in said preparation zone to insure condensation of vapors on the surfaces of said solids therein; contacting that portion of said contiguous mass flowing through said conversion zone with a stream of said normal paraffinic hydrocarbon under conditions of temperature and pressure insuring isomerization of same in vapor phase to form an isoparaffin; by-products of said isomerization being formed and comprising carbonaceous materials and a liquid complex of hydrocarbon, aluminum chloride, and ferric chloride, said by-products adhering to the surfaces of solids passed from said conversion zone; directly contacting that portion of said contiguous mass flowing through said recovery zone with a gas chemically inert to said mass and to said by-product materials adhered on its particle surfaces, at a temperature sufficiently high so as to distill active aluminum chloride and a predetermined portion of ferric chloride from said complex, into said inert gas; removing said inert gas containing aluminum chloride and ferric chloride vapors from said recovery zone and passing same into said preparation zone to condense said vapors on solids particles therein as discussed hereinabove; that portion of said contiguous mass passed into said combustion zone containing said carbonaceous matter and residual ferric chloride on its particle surfaces; in said combustion zone burning carbonaceous matter free from said solids surfaces and distilling residual ferric chloride therefrom at a temperature determined by said burning; withdrawing a stream of solids from said combustion zone free from said adhered by-product materials and passing the withdrawn solids to said preparation zone; and recovering an isoparaffin hydrocarbon from said conversion zone.

2. A catalytic process for isomerizing a normal paraffinic hydrocarbon to an isoparaffinic hydrocarbon, comprising gravitationally flowing a contiguous mass of flowable particulate solids through a series of zones comprising a catalyst preparation zone, a conversion zone disposed below said catalyst preparation zone, a catalyst recovery zone disposed below said conversion zone and a combustion zone disposed below said catalyst recovery zone; contacting that portion of said contiguous mass flowing through said preparation zone at a temperature within the limits of 200 to 350° F., and a pressure within the limits of 0 to 15 p. s. i. g. with a gas stream containing vapors of aluminum chloride and of ferric chloride, whereby said vapors condense on the surfaces of solids particles therein; contacting that portion of said contiguous mass flowing through said conversion zone at a temperature within the limits of 100 to 360° F. and a pressure within the limits of 0 to 15 p. s. i. g. with a normal paraffinic hydrocarbon stream comprising hydrocarbons containing from 4 to 7 carbon atoms in the molecule, whereby isoparaffin hydrocarbon is formed from said paraffinic hydrocarbon as isomerization product; by-product of said isomerization being formed and comprising carbonaceous materials and a liquid complex of hydrocarbon, aluminum chloride, and ferric chloride; said by-products adhering to the surfaces of solids passed from said conversion zone; directly contacting that portion of said contiguous mass flowing through said recovery zone at a temperature within the limits of 375 to 750° F., with a stream of gas chemically inert to said mass therein and to said by-product materials adhered to its particle surfaces, so as to distill active aluminum chloride and a predetermined portion of ferric chloride from said complex into said inert gas; removing said inert gas containing vapors from said distilling from said recovery zone and passing same into said preparation zone to condense said vapors on solids surfaces as discussed hereinabove; that portion of said contiguous mass passed into said combustion zone containing said carbonaceous matter and residual ferric chloride on its particle surfaces; in said combustion zone burning carbonaceous matter free from said solids surfaces at a temperature within the limits of 900 to 1200° F. and distilling residual ferric chloride therefrom during said burning; withdrawing a stream of solids from said combustion zone free from adhered by-product materials and passing same to said preparation zone; and recovering an isoparaffin hydrocarbon from said conversion zone.

3. The process of claim 2 wherein said normal paraffinic hydrocarbon material is n-butane and said isoparaffin isomerization product is isobutane.

4. The process of claim 2 wherein said stream of solids withdrawn from said combustion zone is contacted in heat exchange relation with a cooler fluid prior to its introduction into said preparation zone.

5. The process of claim 2 wherein the temperature of said contacting in said recovery zone is maintained within a range of 500 to 750° F.

6. The process of claim 2 wherein said chemically inert gas is n-butane.

7. The process of claim 2 wherein the mol ratio of aluminum chloride to ferric chloride in said conversion zone is maintained within the limits of 0.5:1 to 20:1.

8. The process of claim 2 wherein at least a portion of said inert gas from said recovery zone is passed through a body of solid unsupported catalyst material at a temperature within the limits of 375 to 750° F. prior to introduction of said inert gas stream into said preparation zone, whereby make-up catalyst is introduced into said conversion zone.

9. The process of claim 2 wherein said contiguous solids mass is a bauxite having a mesh size within the limits of 2 to 8.

10. A catalytic process for isomerizing a normal paraffinic hydrocarbon to an isoparaffinic hydrocarbon, comprising contacting a contiguous mass of granular solids with a gas stream defined hereafter and containing vapors of ferric chloride and aluminum chloride as catalyst; maintaining temperature and pressure conditions during said contacting to insure condensation of chloride vapors on the particle surfaces of said mass, whereby said mass is impregnated with chloride catalyst; contacting the impregnated mass with a stream of a normal paraffinic hydrocarbon under temperature and pressure conditions insuring isomerization of same in vapor phase to form an isoparaffin; by-products of said isomerization being formed and comprising carbonaceous materials, and a liquid complex of hydrocarbon and chloride catalyst; said by-products adhering to the surfaces of solids in said mass during said isomerization; heating said mass containing said by-product adhered to its particle surfaces at a distillation temperature of chloride catalyst in said complex, so as to distill aluminum chloride and a predetermined proportion of ferric chloride vapors from said complex; recovering said vapors from said distillation and suspending same in an inert gas and then passing the resulting gas admixture in contact with said contiguous mass of granular solids as said gas stream containing ferric chloride and aluminum chloride; burning said adhered carbonaceous by-product free said particle surfaces and distilling residual ferric chloride therefrom by heat of said burning; the resulting mass freed from chloride and carbonaceous matter comprising the said granular mass contacted with said stream containing vapors of aluminum chloride and ferric chloride; and recovering said isoparaffin as a product of the process.

11. The process of claim 10 wherein said predetermined proportion of ferric chloride is sufficient to provide for condensing ferric chloride on said contiguous mass in proportions for providing a catalyst containing aluminum chloride in a weight ratio to ferric chloride within the range of 0.5:1 to 20:1.

12. In the isomerization of a normal paraffinic hydrocarbon to an isoparaffinic hydrocarbon in the presence of a granular mass having its particle surfaces impregnated with aluminum chloride and ferric chloride as isomerization catalyst, and wherein byproducts of said isomerization are formed and comprise carbonaceous materials and a liquid complex of hydrocarbon and chloride catalyst, the said byproducts adhering to the particle surfaces of said granular mass during said isomerization whereby activity of the said catalyst is impaired, the improvement comprising removing granular catalyst material from the zone of said isomerization and heating the last said material containing said byproduct adhered to its particle surfaces at a distillation temperature of chloride catalyst in said complex so as to distill aluminum chloride and a predtermined proportion of ferric chloride vapors from said complex, burning adhered carbonaceous byproduct from particles of said material previously subjected to said distillation and distilling residual ferric chloride therefrom by heat of said said burning, recovering vapors from said distillation and contacting same with particles previously freed from carbonaceous materials so as to insure condensation of said vapors on the surfaces of said particles, and utilizing resulting impregnated granular particles as catalyst for said isomerization.

13. In the isomerization of a hydrocarbon in the presence of a granular mass having its particle surfaces impregnated with aluminum chloride and ferric chloride as isomerization catalyst, and wherein byproducts of said isomerization are formed and comprise carbonaceous materials and a liquid complex of hydrocarbon and chloride catalyst, the said byproducts adhering to the particle surfaces of said granular mass during said isomerization whereby activity of the said catalyst is impaired, the improvement comprising removing granular catalyst material from the zone of said isomerization and heating the last said material containing said byproduct adhered to its particle surfaces at a distillation temperature of chloride catalyst in said complex so as to distill aluminum chloride and a predetermined proportion of ferric chloride vapors from said complex, burning adhered carbonaceous byproduct from particles of said material previously subjected to said distillation and distilling residual ferric chloride therefrom by heat of said burning, recovering vapors from said distillation and contacting same with particles previously freed from carbonaceous materials so as to insure condensation of said vapors on the surfaces of said particles, and utilizing resulting impregnated granular particles as catalyst for said isomerization.

References Cited in the file of this patent

UNITED STATES PATENTS

| Number | Name | Date |
|---|---|---|
| 1,464,373 | Steuart | Aug. 7, 1923 |
| 2,323,830 | McMillan | July 6, 1943 |
| 2,364,583 | DeSimo et al. | Dec. 5, 1944 |
| 2,388,932 | Ogorzaly | Nov. 13, 1945 |
| 2,407,700 | Huff | Sept. 17, 1946 |
| 2,407,914 | Bailey et al. | Sept. 17, 1946 |
| 2,416,019 | Patterson | Feb. 18, 1947 |
| 2,461,104 | Bates | Feb. 8, 1949 |
| 2,476,416 | Ipatieff et al. | July 19, 1949 |
| 2,483,487 | Carney | Oct. 4, 1949 |